(12) United States Patent
Herget et al.

(10) Patent No.: US 10,873,575 B2
(45) Date of Patent: Dec. 22, 2020

(54) METHOD FOR PROVIDING A PERSONAL IDENTIFICATION CODE OF A SECURITY MODULE

(71) Applicant: GIESECKE+DEVRIENT MOBILE SECURITY GMBH, Munich (DE)

(72) Inventors: Werner Herget, Munich (DE); Thomas Werner, Munich (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 157 days.

(21) Appl. No.: 15/576,626

(22) PCT Filed: May 25, 2016

(86) PCT No.: PCT/EP2016/000873
§ 371 (c)(1),
(2) Date: Nov. 22, 2017

(87) PCT Pub. No.: WO2016/188637
PCT Pub. Date: Dec. 1, 2016

(65) Prior Publication Data
US 2018/0167382 A1     Jun. 14, 2018

(30) Foreign Application Priority Data
May 26, 2015   (DE) .................. 10 2015 006 751

(51) Int. Cl.
*H04L 29/06*     (2006.01)
*H04L 9/32*      (2006.01)
(Continued)

(52) U.S. Cl.
CPC ....... *H04L 63/0838* (2013.01); *G06Q 20/401* (2013.01); *H04L 9/0827* (2013.01);
(Continued)

(58) Field of Classification Search
CPC ... H04L 63/0838; H04L 9/3228; H04L 63/18; H04L 9/0827; H04L 9/3234; H04L 63/0853; H04L 2209/56; G06Q 20/401
See application file for complete search history.

(56) References Cited

U.S. PATENT DOCUMENTS

| 6,078,908 A   | 6/2000 | Schmitz |
| 6,985,583 B1* | 1/2006 | Brainard ................. G06F 21/31 380/277 |

(Continued)

FOREIGN PATENT DOCUMENTS

| CA | 2692083 A1  | 12/2008 |
| DE | 19507044 A1 | 9/1996  |

(Continued)

OTHER PUBLICATIONS

German Search Report from DE Application No. DE 10 2015 006 751.6, dated May 3, 2016.
(Continued)

*Primary Examiner* — Carl G Colin
*Assistant Examiner* — Hany S. Gadalla
(74) *Attorney, Agent, or Firm* — Workman Nydegger

(57) ABSTRACT

A method for providing a personal identification code of a security module, includes a personal identification code assigned to the security module and a server is provided which a user of the security module can access after an authentication. In the method, triggered by a request from the user at the server, an authentication code is transmitted to a terminal of the user by means of a first message. An authentication code input by the user is received at the server, whereupon it is verified whether the input authentication code matches the authentication code transmitted to the terminal, wherein, in the case of a match, the personal (Continued)

identification code is transmitted to the terminal of the user by means of a second message.

19 Claims, 2 Drawing Sheets

(51) Int. Cl.
    *H04L 9/08*     (2006.01)
    *G06Q 20/40*     (2012.01)

(52) U.S. Cl.
    CPC .......... *H04L 9/3228* (2013.01); *H04L 9/3234* (2013.01); *H04L 63/18* (2013.01); *H04L 63/0853* (2013.01); *H04L 2209/56* (2013.01)

(56) References Cited

U.S. PATENT DOCUMENTS

| | | | |
|---|---|---|---|
| 2003/0041244 A1* | 2/2003 | Buttyan | G06Q 20/20 713/172 |
| 2004/0172535 A1* | 9/2004 | Jakobsson | G06Q 20/341 713/168 |
| 2004/0172536 A1* | 9/2004 | Malville | H04L 63/0428 713/169 |
| 2007/0180504 A1* | 8/2007 | Hung | G06F 21/335 726/5 |
| 2009/0037285 A1* | 2/2009 | Murphy | G06Q 20/20 705/16 |
| 2012/0066749 A1* | 3/2012 | Taugbol | G06F 21/40 726/6 |
| 2012/0180116 A1* | 7/2012 | Sagi | H04L 63/08 726/7 |
| 2012/0239572 A1* | 9/2012 | Wolfs | G06Q 20/20 705/44 |
| 2012/0303527 A1* | 11/2012 | Karlisch | G06Q 20/425 705/44 |
| 2013/0297513 A1* | 11/2013 | Kirillin | G06Q 40/02 705/67 |
| 2016/0150405 A1* | 5/2016 | Soulez | H04M 3/42042 455/415 |
| 2016/0217456 A1* | 7/2016 | Gaur | G06Q 20/385 |
| 2016/0232335 A1* | 8/2016 | Violleau | G06F 21/30 |
| 2018/0077150 A1* | 3/2018 | Narayan | H04W 12/04 |

FOREIGN PATENT DOCUMENTS

| | | |
|---|---|---|
| DE | 19718103 A1 | 6/1998 |
| DE | 19850307 A1 | 5/2000 |
| EP | 1107089 A1 | 6/2001 |
| EP | 1195973 A1 | 4/2002 |
| EP | 2053569 A2 | 4/2009 |
| EP | 2187363 A1 | 5/2010 |
| EP | 2528045 A1 | 11/2012 |
| WO | 2006056826 A1 | 6/2006 |

OTHER PUBLICATIONS

International Preliminary Report on Patentability from PCT Application No. PCT/EP2016/000873, dated Aug. 23, 2016.
International Search Report from PCT Application No. PCT/EP2016/000873, dated Aug. 23, 2016.
"Transaction Authentication Number," Wikipedia, requested from https://en.wikipedia.org/w/index.php?title=Transaction_authentication_number&oldid=651206307 on Jun. 24, 2015, pp. 1-6.
Canadian Office Action from CA Application No. 2986618, dated Oct. 22, 2019.

* cited by examiner

METHOD FOR PROVIDING A PERSONAL IDENTIFICATION CODE OF A SECURITY MODULE

BACKGROUND

The invention relates to a method and a system for supplying a personal identification code of a security module.

Security modules such as chip cards for example, are frequently protected by personal identification codes or PINs which are known only to the holder or user of the security module. In this regard, various methods are known from the prior art for making the personal identification code known to the user of the security module for the first time. The identification code is frequently delivered to the user by mail in a separate letter. This separate shipment of the identification code is complicated and expensive.

From DE 195 07 044 the so-called "zero PIN method" is known, in which the user has to input a PIN consisting exclusively of the series of digits "0000" when putting a SIM card into operation for the first time. Upon the initial activation of the SIM card, the input can be effected in a menu specially provided for this purpose. Such a menu is described in DE 198 50 307. Additional security is obtained for the user by ascertaining the PIN from the last four digits of his SIM card number or from his date of birth, for example. Such a method is described in EP 2 053 569 A1.

The disadvantage of these methods is that both the zero PIN and the PIN formed from the card number or the date of birth can be ascertained very easily, and consequently a SIM card that is delivered by mail and is intercepted maliciously can be misused very easily.

In EP 2 187 363, the electronic transmission of a personal identification number for a card to a user of the card is described. The user receives a retrieval code for retrieving the personal identification number. After the retrieval code has been transmitted by the user by means of an SMS message, the personal identification number is supplied to the user via an SMS message in turn.

SUMMARY

The object of the invention is to create a method and a system with which a personal identification code of a security module is supplied to a user in a simple manner.

In the method according to the invention a personal identification code is supplied which is assigned to a security module. Here, a server is employed which a user (holder) of the security module can access after authentication. Preferably, this access to the server is effected via a network, such as the Internet.

The security module is preferably a portable data carrier. In particular, the portable data carrier is a chip card, such as a bank card or credit card or a SIM/USIM card, for example. Likewise, the portable data carrier can be a USB token or an RFID transponder.

Within the framework of the method, triggered by a request of the user at the server, an authentication code, which is preferably a one-time password, is transmitted to a terminal of the user by means of a first message.

An authentication code subsequently input by the user is received at the server, wherein in a next step of the method of the invention it is verified whether the input authentication code matches the above authentication code that was transmitted to the terminal. In the case of a match of the input authentication code with the transmitted authentication code, the personal identification code is finally transmitted to the terminal of the user by means of a second message. Analogously to the first message, the second message is preferably addressed to a mobile communication number allocated to the user. In particular, the second message is also an SMS message. If the authentication codes do not match, the sending of the second message is prevented.

With the method of the invention an electronic transmission of the personal identification code to a terminal of the user is achieved in a simple manner by means of a server. The process is particularly secure, since the transfer of the personal identification code is coupled to an authentication code received by the server and previously transferred to the terminal of the user. The method for transmission of the personal identification code is triggered/initiated by the request of the user at the server.

The terminal is preferably a mobile terminal, especially a mobile communication device. The terminal preferably has at least one network interface (mobile communication, WLAN, Internet interface). In a preferred variant, the first message is addressed to a communication number, such as mobile communication number or IP address, allocated to the terminal (or the user). In particular, the first message can be an SMS message or short message (SMS=Short Message Service), which is known per se. Alternatively, the first message can be an Internet message, for example, which is transferred to an application (app, for example, a messenger app) of the terminal.

The authentication (or registration) of the user at the server can be effected by any desired route, for example by user name and password, by biometric features or by means of an authentication application on a different (or the same) security module.

In a preferred embodiment the user is registered already in advance at the server for the authentication (registration) of the user. Particularly preferably the user's terminal is already registered in advance at the server with its communication number. In a particularly preferred embodiment, the server used in the method of the invention is an online transaction server, for example an online banking system of a credit institution or a bank. By means of such a server, transactions (such as monetary transactions, for example) can be carried out electronically. Such a server already contains corresponding components which enable the transmission of an authentication code and the verification of an authentication code within the framework of an online transaction. The online transaction server contains the pre-registered authentication data of the user. These components and/or authentication data can now be utilized in the method of the invention for supplying a personal identification code for a security module.

In a particularly preferred embodiment the above-described online transaction server employs transaction codes, for example as TAN or OTP, for verifying transactions initiated by the user, wherein, in response to the request of the user, a transaction code is transmitted as authentication code to the terminal of the user by means of the first message. Accordingly, a TAN method or smsTAN method of an online transaction server that is known per se is utilized for providing the personal identification code.

In a further preferred embodiment, the first and/or second message is transmitted to the terminal of the user by a supply entity (i.e. a separate server) which communicates with the above server.

The issuer of the security module, for which the method of the invention supplies the personal identification code, optionally can be the operator of the server as well. Nevertheless, the issuer of the security module and the operator of the server can also be two different entities, such as two different banks, for example. Likewise, the supply entity can be an entity that is independent of the issuer of the security module and/or the operator of the server. This can be the manufacturer of the security module, for example.

In a particularly preferred embodiment of the method of the invention, the authentication code is generated in the server. Preferably, the authentication code generated in the server is also transmitted to the user of the terminal by the server by means of the first message.

In a further variant of the method of the invention, where the above-described supply entity is employed, the authentication code generated in the server is transmitted to the supply entity by the server, said supply entity transmitting the transmitted authentication code to the terminal of the user by means of the first message.

In a further embodiment of the method of the invention, the server instructs the supply entity to generate the authentication code, whereupon the supply entity produces the authentication code and transmits it to the terminal of the user by means of the first message.

In a particularly preferred embodiment of the method of the invention, the check of the match of the input authentication code with the authentication code transmitted to the terminal is effected by the server itself. When the supply entity is employed, said entity assumes the transmission of the second message in a preferred variant of the above-described embodiment. In other words, in the case of a match of the input authentication code with the authentication code transmitted to the terminal, a confirmation is supplied to the supply entity by the server, wherein the supply entity transmits the second message to the terminal of the user in response to the supply of the confirmation. The supply of the confirmation can be effected by transmitting the confirmation from the server to the supply entity. Likewise, the supply of the confirmation can be effected in the form of transaction carried out by the server. The confirmation can optionally include a user name or user identification of the user. Further, the confirmation can optionally include the authentication code.

In a further preferred variant of the method of the invention the server supplies the user with an input mask for the authentication code.

When the above supply entity is employed in the method of the invention, in a further embodiment, the check of the match of the input authentication code with the authentication code transmitted to the terminal can also be effected by the supply entity, wherein the supply entity transmits the second message to the terminal of the user in the case of a match.

In a further preferred variant of the invention, wherein the first and second messages are addressed to a communication number allocated to the user, this communication number is deposited in a memory in advance, i.e. prior to performing the method of the invention. From this memory, the communication number is read for transmitting the first and second messages. Nevertheless, there is also the possibility that the communication number allocated to the user is transmitted from the user to the server while the method of the invention is being carried out. In other words, the communication number is retrieved from the user by the server and is input to the server by the user within the framework of carrying out the method. The transmission of the communication number can for example take place on the server together with the above request of the user.

In a further embodiment, the method of the invention is employed in combination with a security module, to which one or several initial identification codes are assigned, which are frequently also referred to as transport PINs. Upon delivery of the security module, the initial identification code or a single one of the initial identification codes is activated and this activated initial identification code is supplied as personal identification code by the method of the invention. The user can set up a new personal identification code for the security module with the activated initial identification code transmitted to his terminal. In the event that several identification codes are assigned to the security module, in a preferred variant a different initial identification code is activated, provided that an initial, previously activated identification code or personal identification code newly set up by the user is blocked.

In addition to the above-described method, the invention further relates to a system for providing a personal identification code of a security module, wherein the personal identification code is assigned to the security module. The system includes a server which the user of the security module can access after authentication. The system is adapted for carrying out a method, wherein:

triggered by a request of the user at the online portal, an authentication code is transmitted to a terminal of the user by means of a first message;

an authentication code input by the user is received at the server, whereupon it is verified whether the input authentication code matches the authentication code transmitted to the terminal, wherein, in the case of a match, the personal identification code is transmitted to the terminal of the user by means of a second message.

In a preferred embodiment, the system according to the invention is adapted to carry out one or several preferred variants of the method according to the invention.

BRIEF DESCRIPTION OF THE DRAWINGS

Embodiments of the invention will be described in detail subsequently with reference to the enclosed figures.

The figures are described as follows.

DETAILED DESCRIPTION OF VARIOUS EMBODIMENTS

Figure 1:
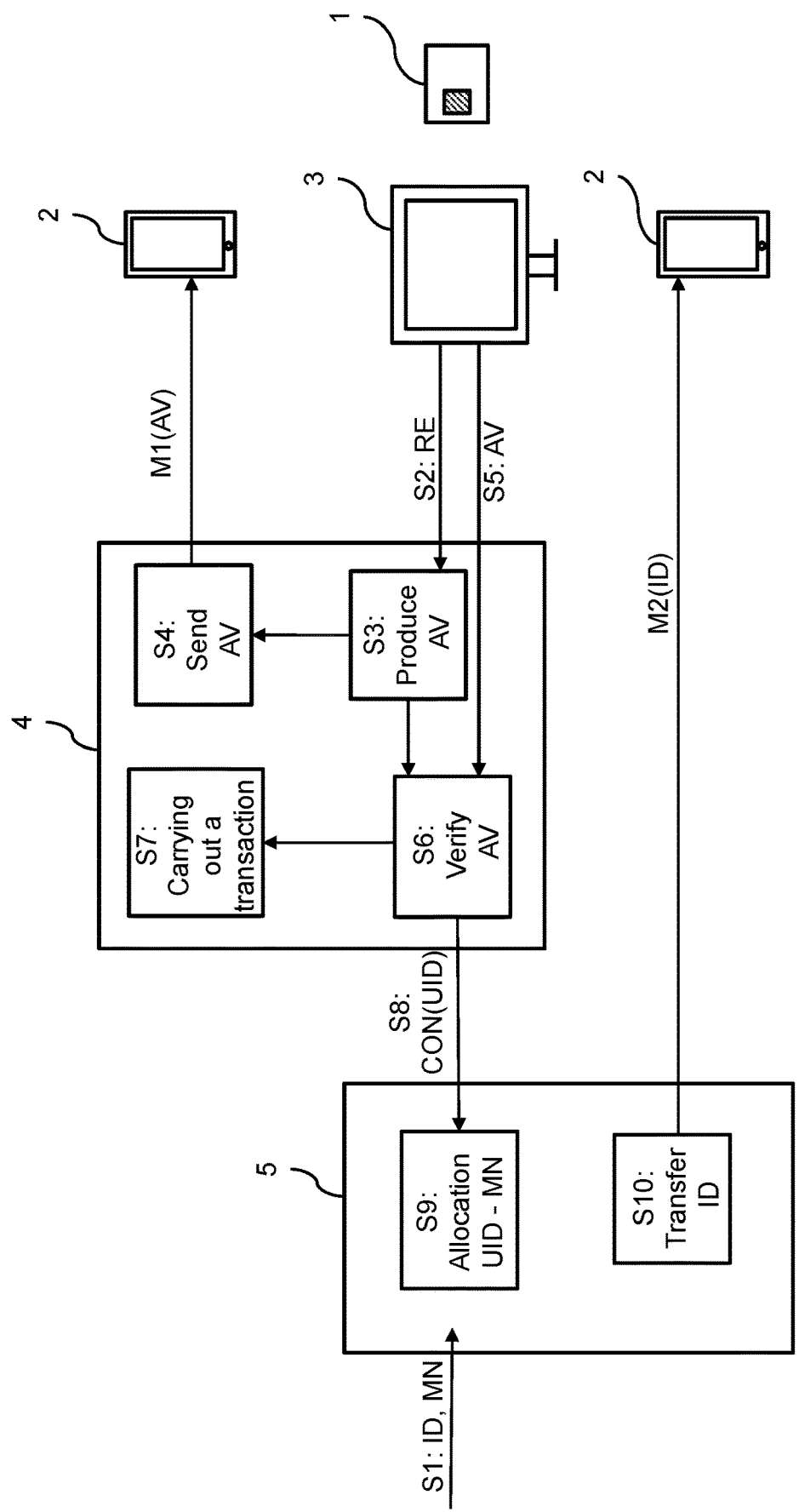
FIG. 1 a schematic representation of a first variant of the method of the invention.

In the following, embodiments of the invention are described on the basis of a personal identification code in the form of a PIN of a chip card 1. The PIN is designated by the reference numeral ID in FIG. 1. The chip card 1 here represents a bank card or credit card of a bank. The card does not necessarily have to contain a chip. By means of the PIN, the user of the chip card 1 (i.e. the card holder) can authenticate monetary transactions. For example, he can withdraw money by inputting the PIN at a bank terminal in which the chip card 1 is inserted.

Conventionally, the PIN associated with the card is communicated to the user of the chip card 1 by mail. In the embodiments described herein, the transmission of the PIN is effected in electronic form, involving a server in the form of an online banking system 4. The online banking system in the embodiment described herein belongs to the bank which issued the card 1. Nevertheless, the online banking system can also belong to another bank, which does not correspond to the bank of the issuer of the chip card 1. Further, it is also possible that the issuer of the chip card 1 is the supply entity 5 described below. Optionally, the issuer of the card 1, the online banking system 4 and the supply entity 5 can be three independent entities.

The online banking system 4 is based on a conventional online transaction server, with which monetary transactions (transfers, bookings, credits) are carried out that have been specified by a user at the online banking system 4 via a terminal 3. Here, the smsTAN method is utilized that is known per se, in which an authentication code is produced in the online banking system 4 before carrying out a transaction and is transmitted to a mobile communication device 2 of the user by means of an SMS message. The user then inputs the authentication code via the terminal 3 at the online banking system 4, which carries out the transaction only if the input authentication code matches the authentication code previously transmitted to the mobile communication device 2. According to the embodiment of FIG. 1, the functionality of the smsTAN method is now utilized for the new purpose of the electronic transmission of the PIN ID to the user.

Within the framework of carrying out the method of FIG. 1, in addition to the PIN ID, a mobile communication number MN is required in the form of an MSISDN which is allocated to the mobile communication device 2 of the user of the chip card 1. According to FIG. 1, both the PIN ID and the mobile communication number MN are stored in advance in a supply entity 5 in the form of a further server, as indicated by the corresponding step S1. The PIN and/or the mobile communication number are transmitted to the supply entity 5 via a secure channel. The PIN and the mobile communication number in the embodiment example described here are from the bank which issued the chip card 1 and which also operates the online banking system 4. The mobile communication number MN was registered in advance with the bank and is also deposited in the online banking system 4. The mobile communication number stored in the supply entity 5 can optionally be deleted or updated when a change takes place after carrying out the method.

In an alternative variant, the mobile communication number MN need not be deposited in advance in the online banking system 4 and/or the supply entity 5, but it can be supplied to the online banking system 4 and/or the supply entity 5 while carrying out the method. Preferably, the mobile communication number is entered here at the online banking system 4 by the card holder. The mobile communication number is thus at the disposal of the online banking system 4, which transmits the number also to the supply entity 5. In this case, a distinction between pre-registered mobile communication numbers and newly input mobile communication numbers is no longer required, since the mobile communication number is always specified by the user. Moreover, no functionalities need to be provided any more for deleting or updating the mobile communication number.

According to the embodiment of FIG. 1, the user of the chip card 1 is logged in via the Internet at the online banking system 4 by means of a corresponding authentication. The user employs the Internet-capable terminal 3 (e.g. a computer), via which he accesses the online banking system 4 by means of a browser. First, in step S2 the user inputs at the online banking system 4 a request RE for the electronic supply of the PIN ID belonging to the card 1. The online banking system 4 subsequently in step S3 produces an authentication code AV (AV=authentication value). This authentication code is a transaction code known per se in the form of a TAN (or a one-time password), which is conventionally utilized for authenticating monetary transactions at the online banking system. The transaction code can also be referred to as a transaction release code.

The authentication code AV is then sent by the server 4 to the mobile communication device 2 of the user in a step S4. This is effected by means of the transmission of an SMS message M1, which is sent to the mobile communication device 2 of the user employing the known mobile communication number MN. Instead of an SMS, here and also in the following an Internet message can be transferred to a (messenger) app on the mobile communication device, for example. The authentication code AV is provided for one-time use only (i.e. as a one-time password). Thus, no increased security requirements need to be provided within the framework of the transmission of the SMS message M1 in step S4, since the life cycle of the authentication code AV is very short. In particular, it is not required to check whether the SMS was actually delivered, since this process can be started again at any time. Thus, a conventional SMS aggregator can be used for sending the authentication code AV.

After delivery of the message M1 the user reads the authentication code AV from the display of the mobile communication device 2 and in step S5 inputs it at the online banking system 4 by means of the terminal 3, namely in the manner in which inputting an smsTAN is usually effected. The authentication code AV is then verified in the server 4 in step S6. This means that the server 4 checks whether the authentication code previously produced in step S3 matches the authentication code received in step S5. If this is the case, the verification of the authentication code AV was successful. If the authentication code had been used within the framework of a conventional monetary transaction, this transaction would have been executed in step S7, provided that the verification in step S6 was successful. In the embodiment example of FIG. 1 now the step S8 is coupled to the successful verification of the authentication code in step S6, in which step a confirmation CON, which includes a user identification UID of the user, is transmitted to the supply entity 5 by the server 4 via a secure interface.

In the supply entity 5 links between user identifications and mobile communication numbers are deposited. Based on these links, in step S9 the supply entity 5 allocates the user identification UID previously transferred in step S8 to the mobile phone communication number MN. Then, in step S10, the supply entity 5 sends the PIN ID which was supplied to it in step S1 to the mobile communication device 2 of the user. This is again effected by sending an SMS message M2, which contains the PIN ID. For the purpose of clear representation, the mobile communication device 2 of the user is represented again in connection with the transmission of the message M2 in FIG. 1 and also in FIG. 2 described further below.

The user thus receives the PIN for his card 1 electronically and can carry out corresponding transactions by means of the card and the transmitted PIN subsequently. Since corresponding authentications and verifications have been carried out in advance, no special security requirements need to be implemented either for the transmission of SMS in step S10. Rather, a conventional SMS aggregator can be used for the transmission of the SMS.

In a secure configuration, the authentication code AV is sent only once in step S4. Likewise or additionally, it can be provided to permit for the PIN transmitted in step S1 only one request S2 and/or only one transmission S10. A second request S2, sending S4 and/or transmission S10 would then require a repeated transmission S1 of the PIN or a not represented release for a restart of the sequence of the method (with steps S2 to S10).

In a modified variant of the method of FIG. 1, the confirmation of a successful verification of the authentication code is not communicated to the supply entity 5 immediately by means of the transmission of a user ID (step S8). Rather, the successful verification of the authentication code is coupled to carrying out a special transaction (e.g. the transfer of one cent) to a special number of an account to which the supply entity 5 has access. This special transaction is carried out in the corresponding step S7. Once the supply entity 5 detects that this special transaction has been carried out, it transmits the PIN ID to the mobile communication number MN of the mobile communication device 2 by means of the corresponding SMS message M2.

Figure 2:
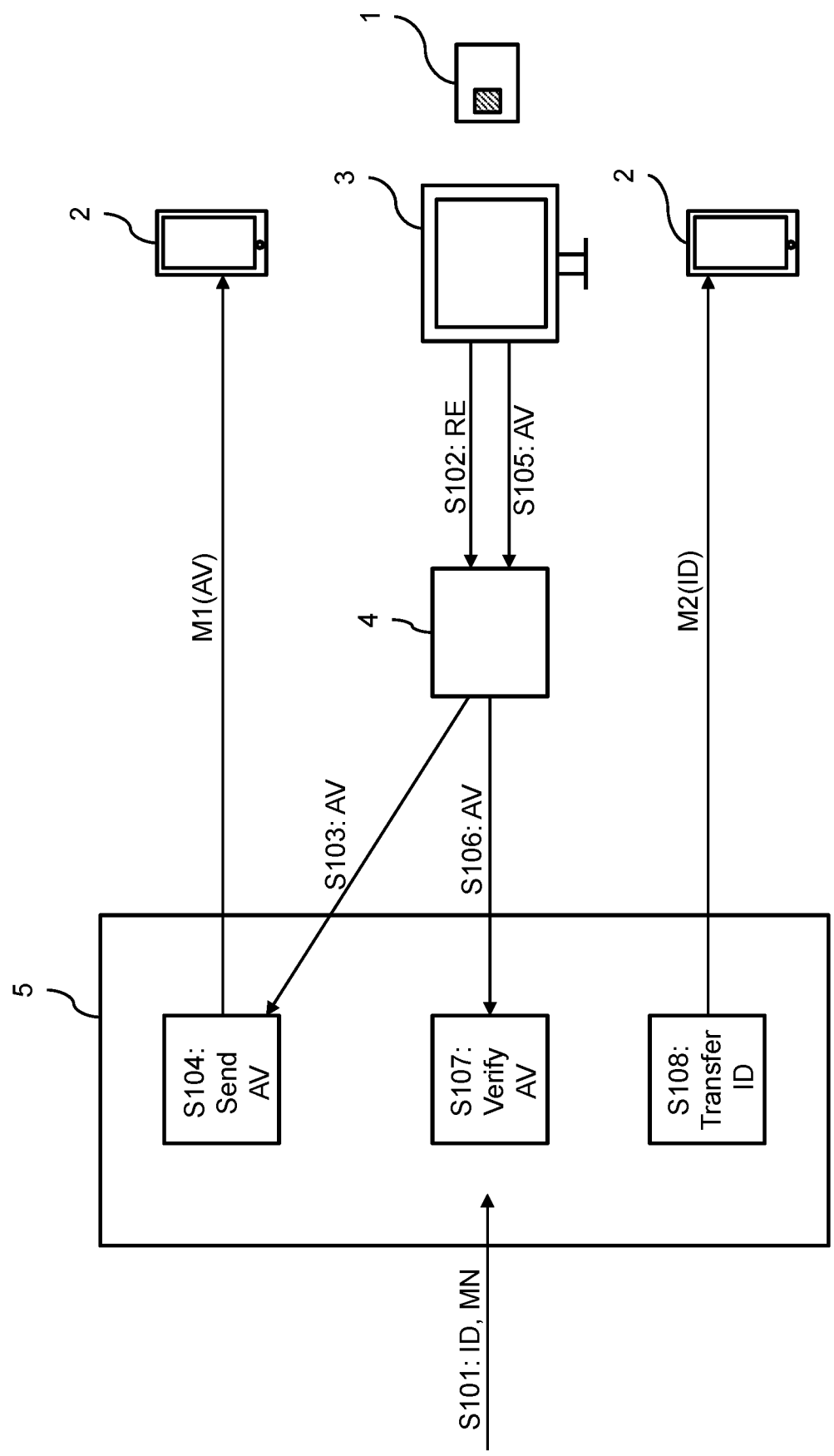
FIG. 2 a schematic representation of a second variant of the method of the invention.

FIG. 2 shows a second variant of the method according to the invention. In this variant, the supply entity 5 assumes functions that are carried out by the server 4 in the embodiment of FIG. 1. Analogously to step S1 of FIG. 1, in step S101, both the PIN ID and the mobile communication number MN are supplied in the supply entity 5 in advance. In step S102, the user inputs—analogously to step S2 of FIG. 1—a request RE for the electronic supply of the PIN ID belonging to the card 1 at the online banking system 4. The online banking system 4 subsequently produces the corresponding authentication code AV, which is transmitted in step S103 by the online banking system 4 to the supply entity 5 via a secure interface. The transmission of the authentication code AV in step S103 triggers in the supply entity 5 the sending (step 104) of this code to the mobile communication device 2 of the user by means of the SMS message M1.

In analogy to the method of FIG. 1, the user reads the authentication code AV transmitted with the message M1 from the display of the mobile communication device 2 and inputs it in step S105 at the online banking system 4 by means of the terminal 3. The authentication code AV is then transmitted in step S106 via the secure interface to the supply entity 5 that verifies the authentication code in step S107, i.e. it checks whether the authentication code previously transmitted in step S103 matches the authentication code received in step S106. If this is the case, the supply entity 5 in step S108 transfers the PIN ID to the mobile communication number of the mobile communication device 2 by means of SMS message M2.

In a modified variant of the method of FIG. 2, in step S103 also merely a send command without authentication code can be transmitted to the supply entity 5. In response to the send command, the authentication code is then produced by the supply entity 5 itself, which in turn sends this code in step S104 by means of a short message to the terminal 2.

The method of the invention can be used for example in combination with so-called transport PINs that are deposited on the chip card prior to the shipment of the chip card to the user. Only one of the transport PINs is active here. By means of the above-described method this active transport PIN is transmitted electronically to the user or card holder. The transmitted transport PIN is then utilized by the card holder when employing the card for the first time, for example at a bank terminal. Within the framework of this first-time employment, the card holder can then switch the current transport PIN to inactive or delete it by specifying a new PIN. If this PIN is blocked at a later time, the above-described method can be repeated for a different transport PIN on the card. A sequence for the activation of the transport PINs is deposited in the card here. This means that it is deposited which transport PIN is activated next, in the event that a previous transport PIN becomes inactive.

The embodiments of the invention described in the foregoing have a number of advantages. In particular, the electronic transmission of a chip card PIN is achieved in a simple manner by using an online portal or an online banking system. Use is made in particular of the smsTAN method known per se, wherein the electronic transmission of the PIN is initiated only if a TAN previously transmitted by means of an SMS has been input at the online banking system by a user.

The invention claimed is:

1. A method for supplying a personal identification code of a security module,
    wherein the personal identification code is assigned to the security module, and
    wherein a server is provided, and a user of the security module can access the server after an authentication,
    the method comprising steps of:
    transmitting an authentication code which is a one-time password to a terminal of the user by means of a first message, when triggered by a request of the user at the server;
    receiving an authentication code at the server which is input by the user;
    verifying whether the authentication code input by the user matches the authentication code transmitted to the terminal of the user; and
    responsive to the authentication code input by the user matching the authentication code transmitted to the terminal of the user, transmitting the personal identification code that is assigned to the security module to the terminal of the user by a second message,
    wherein the security module is a portable data carrier having a chip, a USB token, or an RFID transponder.

2. The method according to claim 1, wherein the server is an online transaction server.

3. The method according to claim 2, wherein the online transaction server employs transaction codes for verifying transactions initiated by the user, wherein, in response to the request of the user, a transaction code is transmitted as authentication code to the terminal of the user by means of the first message.

4. The method according to claim 1, wherein the first and/or second message is/are transmitted to the terminal of the user by a supply entity which communicates with the server.

5. The method according to claim 1, wherein the authentication code is generated in the server.

6. The method according to claim 5, wherein the authentication code generated in the server is transmitted to the terminal of the user by the server by means of the first message.

7. The method according to claim 1, wherein the first and/or second message is/are transmitted to the terminal of the user by a supply entity which communicates with the server;
    wherein the authentication code is generated in the server;
    wherein the authentication code generated in the server is transmitted to the supply entity by the server, said supply entity transmitting the transmitted authentication code to the terminal of the user by means of the first message.

8. The method according to claim 1, wherein the first and/or second message is/are transmitted to the terminal of the user by a supply entity which communicates with the server;

wherein the server instructs the supply entity to generate the authentication code, whereupon the supply entity produces the authentication code and transmits it to the terminal of the user by means of the first message.

9. The method according to claim 1, wherein the verification of the match of the input authentication code with the authentication code transmitted to the terminal of the user is effected by the server.

10. The method of claim 9, wherein the first and/or second message is/are transmitted to the terminal of the user by a supply entity which communicates with the server;
wherein responsive to a match of the authentication code input by the user with the authentication code transmitted to the terminal of the user, the supply entity is supplied with a confirmation by the server, wherein, in response to the supply of the confirmation, the supply entity transmits the second message to the terminal of the user.

11. The method according to claim 10, wherein the confirmation is transmitted to the supply entity by the server or is supplied in the form of a transaction carried out by the server.

12. The method according to claim 1, wherein the server supplies the user with an input mask for the authentication code.

13. The method according to claim 1, wherein the first and/or second message is/are transmitted to the terminal of the user by a supply entity which communicates with the server;
wherein the verification of the match of the input authentication code with the authentication code transmitted to the terminal of the user is effected by the supply entity, wherein, in the event of a match, the supply entity transmits the second message to the terminal of the user.

14. The method according to claim 1, wherein the terminal of the user is a mobile communication device.

15. The method according to claim 14, wherein the first message is transmitted to the mobile communication device by an SMS message which is sent to the mobile communication device of the use employing a known communication number of the mobile communication device.

16. The method according to claim 1, wherein the second message is addressed to a mobile communication number allocated to the user.

17. The method according to claim 1, wherein the user is registered in advance at the server for the authentication of the user.

18. A system for supplying a personal identification code of a security module, wherein the system comprises:
a server device which a user of the security module can access after an authentication, wherein the system is adapted for carrying out a method, the server device being a hardware server device,
wherein the personal identification code is assigned to the security module, and
wherein
triggered by a request of the user at the server device, an authentication code, which is a one-time password, is transmitted to a terminal of the user by means of a first message;
an authentication code is received at the server device which is input by the user;
it is verified whether the authentication code input by the user and received at the server device matches the authentication code transmitted to the terminal of the user, and
responsive to the authentication code input by the user matching the authentication code transmitted to the terminal of the user, the personal identification code that is assigned to the security module is transmitted to the terminal of the user by a second message,
wherein the security module is a portable data carrier having a chip, a USB token, or an RFID transponder.

19. The system according to claim 18, wherein the server device is an online transaction server device.

* * * * *